United States Patent [19]

Hansen

[11] 3,897,670

[45] Aug. 5, 1975

[54] APPARATUS AND METHOD FOR PRODUCING, FILLING AND CLOSING THERMOPLASTIC CONTAINERS

[76] Inventor: Gerhard P. Hansen, Heerberg 87, D7161 Laufen am Kocher, Germany

[22] Filed: Oct. 25, 1973

[21] Appl. No.: 409,464

[30] Foreign Application Priority Data
Nov. 15, 1972 Germany............................ 2255869

[52] U.S. Cl. ........................ 53/29; 53/140; 53/192; 425/326 B; 425/DIG. 207
[51] Int. Cl. ............................................ B65b 43/00
[58] Field of Search ......... 53/29, 40, 140, 141, 191, 53/192, 193, 194, 289; 425/326 B, 387 B, DIG. 205, DIG. 207, DIG. 211, 806

[56] References Cited
UNITED STATES PATENTS

| | | | |
|---|---|---|---|
| 2,861,295 | 11/1958 | Hagen | 53/29 X |
| 3,032,809 | 5/1962 | Willard | 425/326 B X |
| 3,325,860 | 6/1967 | Hansen | 53/194 |
| 3,358,062 | 12/1967 | Lemelson | 425/387 B X |
| 3,579,621 | 5/1971 | Mehnert | 425/326 B X |
| 3,597,793 | 8/1971 | Weiler | 425/326 B X |
| 3,626,589 | 12/1971 | Hansen | 425/407 |
| 3,632,713 | 1/1972 | Seefluth | 425/387 B X |
| 3,674,405 | 7/1972 | Hansen | 425/326 B X |
| 3,692,890 | 9/1972 | Cines | 425/326 B X |
| 3,695,805 | 10/1972 | Gilbert | 425/326 B X |

*Primary Examiner*—Travis S. McGehee
*Assistant Examiner*—John Sipos
*Attorney, Agent, or Firm*—Roylance, Abrams, Berdo & Kaul

[57] ABSTRACT

Apparatus and method for producing, filling and closing a container made from an extruded tube of thermoplastic material having hot sealing capabilities. The container is formed by extrusion blow molding, employing a mold having a set of lower segments and a set of top segments, the segments cooperating to define the cavity into which the plastic is blown into the shape of the container, filling of the container being accomplished by use of a filling mandrel including a calibrating mandrel which cooperates with movable mold jaws, carried by the top segments of the mold, to form the top of the container to a precisely predetermined internal shape and dimension appropriate for receiving a stopper.

8 Claims, 4 Drawing Figures

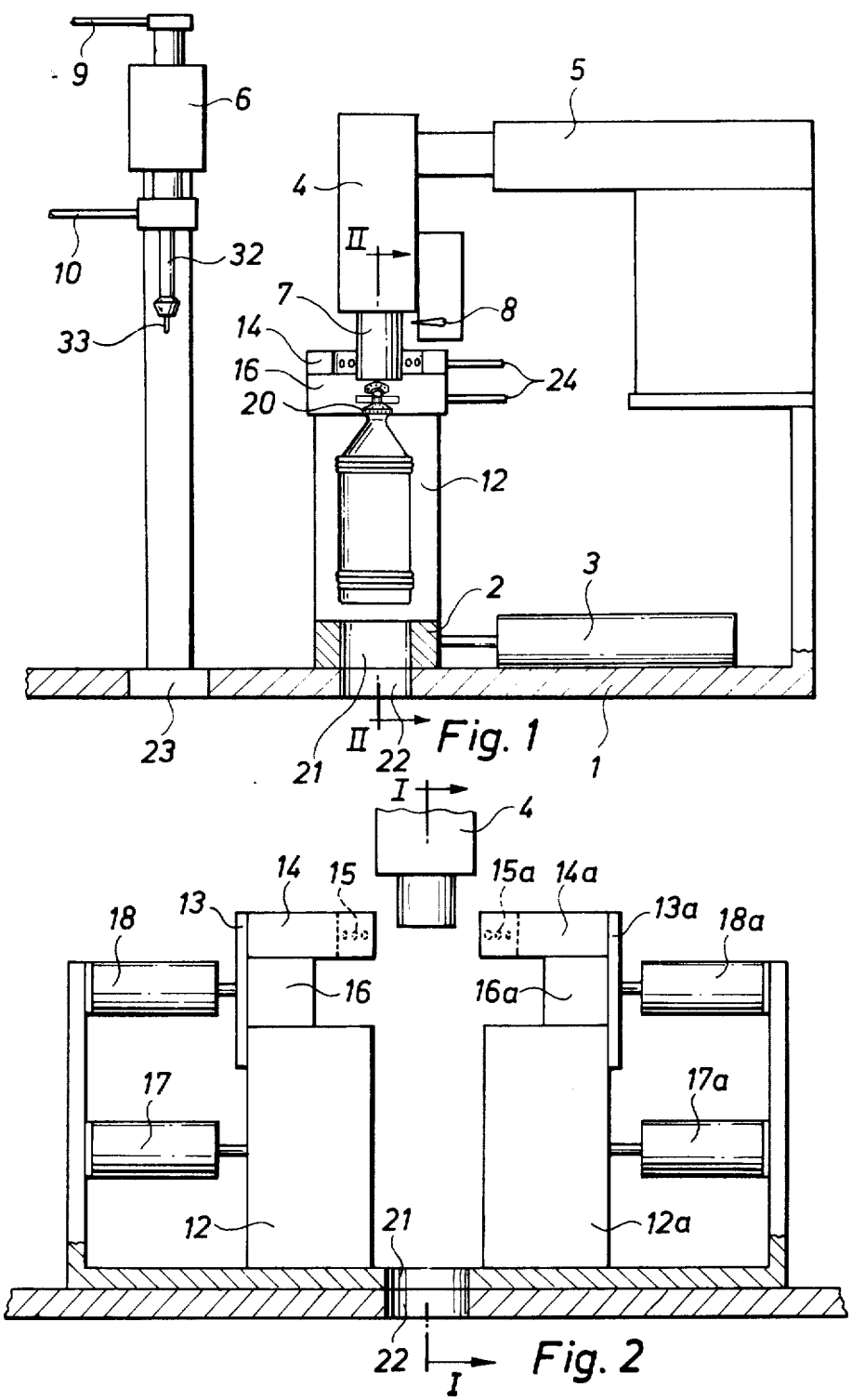

APPARATUS AND METHOD FOR PRODUCING, FILLING AND CLOSING THERMOPLASTIC CONTAINERS

The invention relates to an apparatus and method for the production, filling and closing of a container made of a thermoplastic tube having hot sealing capabilities, employing a container molding arrangement having lower and top mold segments, and with a filler mandrel insertable at least within the part of the plastic tube which is located between the top segments of the mold.

In case of production of a container by means, for example, of an apparatus according to German published application 1,272,807, it can be a disadvantage that, at the point of squeezing of the plastic tube, inwardly projecting beads develop which made the development of a precise inside contour impossible. These beads are particularly disadvantageous in the area of the top of the container, whenever a certain shape must be present at least in an area of the inside surface of the top of the container to cooperate with a precisely and tightly fitting removal plug or closure.

The invention is directed to the task of creating a predetermined shape in the are of the inside of the head of the container to be produced. According to the invention, this task is solved by use of a calibrating spike attached to the free or delivery end of the filler mandrel, the calibrating spike cooperating with calibrating jaws mounted shiftably in the top segments of the mold, which jaws urge the polymeric material adjacent to them (prior to closing of the top segments of the mold) against the calibrating spike so as to form this material precisely to the shape and size of the spike. The calibrating spike has the shape desired for the area of inside surface of the head or top of the container, particularly a circular shape, so that a removable plug-type stopper or the like, corresponding to the calibrating spike, can be inserted into the top of the finished container.

A head part, separable for the purpose of opening the container, can be attached above the calibrating zone, whenever the calibrating jaws on their top side have an inwardly projecting stop collar. As a result of the projecting collar a preset breaking point is produced in the container head. The calibrating point of the container head thus lies directly in the area of its aperture or open top.

It is advantageous, whenever the feed movement of the top halves of the mold is stopped, that the calibrating jaws hold the plastic material on the calibrating spike. For this purpose a stopping arrangement is provided for interrupting the movement of the top segments of the mold after the calibrating jaws have forced the plastic material against the calibrating spike. As a result of this, it is possible to cool the calibrated point of the container head during the closing process of the top segments of the mold to such a point that the shape and dimensions of the calibrated portion will not thereafter change.

Additional advantageous characteristics of the invention will be apparent from the following description of one particularly advantageous embodiment of the invention with reference to the accompanying drawings, which form part of the original disclosure hereof, and wherein:

FIG. 1 is a semi-diagrammatic side elevational view of an apparatus according to the invention, with parts broken away for clarity as indicated by line I—I, FIG. 2;

FIG. 2 is a side elevational view of the apparatus taken generally on line II—II, FIG. 1, but with the container omitted;

Figure 3:
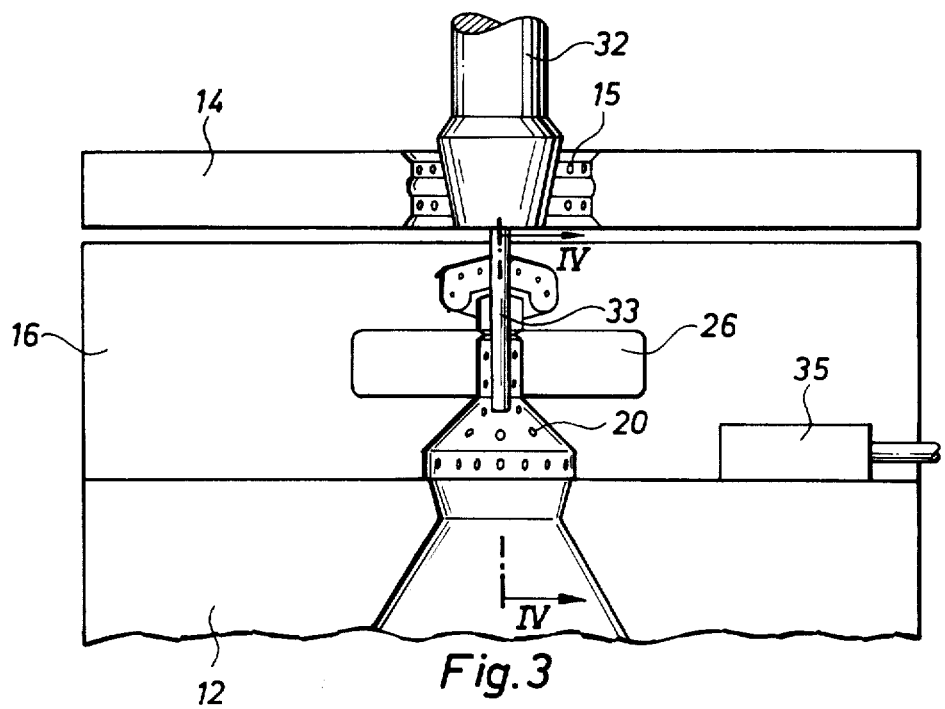
FIG. 3 is an enlarged fragmentary side elevational view of the apparatus of FIG. 1, but with the filling mandrel and calibrating spike inserted into the container.

Referring now to the drawings in detail, a carriage 2 is slideable on table 1 or frame 1 under the influence of an operating cylinder 3 from a first position, below an orifice 4 of a screw extruder 5, to a second position, below a feed and filling arrangement 6 mounted on table 1. The screw extruder 5 serves for the production of a thermoplastic tube 7 of polyethylene, polyvinyl chloride, or like polymeric material, and has a cutting knife 8 in the area of its orifice, for cutting the plastic tube 7 into parison lengths. A conduit 9 connected with a source for compressed air, not shown, and a filler conduit 10 for bringing up the material to be filled into the container, are connected to the filling arrangement 6.

The carriage 2 carries two lower segments of the mold 12 and 12a shiftable transversely to the shifting direction of the piston of the operating cylinder 3, on which lower segments a vacuum chamber 14, 14a is mounted by means of a connecting piece 13, 13a, the side of which chambers, developed like a cylinder and adjacent to the tube 7 which is to be received, is equipped with suction nozzles or orifices 15, 15a. Between the vacuum chamber 14, 14a and the lower halves of the mold 12, 12a top segments of the mold 16, 16a are provided, these being transversely shiftable on the lower segments for the production of the head or top of the container.

The lower mold segments 12, 12a are slidable on the carriage 2 under the influence of operating cylinders 17, 17a, and the top mold segments 16, 16a are movable on the lower segments 12, 12a under the influence of operating cylinders 18, 18a. The top segments 16, 16a are connected in the same way as the vacuum chambers 14, 14a, each via a line 24 with a suction source, not shown, and they have suction nozzles or orifices 20.

In the top mold segments 16, 16a are calibrating jaws 26, 26a mounted to be shifted toward and away from the upper portion of the parison. The calibrating jaws have stop collars 27, 27a which assure driving of the calibrating jaw 26, 26a during return of the top mold segments 16, 16a to their starting positions. The calibrating jaws 26, 26a are mounted to be shifted with radial clearance in intermediate plates 29, 29a having a continuous hole and disposed between the respective top segment of the mold 16, 16a and the adjacent end of the piston rod 28, 28a, whereby the stop collar 27, 27a on its side facing away from the top mold segment 16, 16a, can come to fit against the intermediate plate 29, 29a or the end of the calibrating jaw 26, 26a, facing away from the top mold segment 16, 16a, against the end 28, 28a of the piston rod. Between the end 28, 28a of the piston rod and the bottom of a groove, in the end of the calibrating jaw 26, 26a, facing the intermediate plate 29, 29a, a spring 30, 30a has been fixed, which urges the stop shoulders 27, 27a toward the top mold segments 16, 16a. The calibrating jaw, at its end projecting from the top mold segments 16, 16a, has been developed to correspond to the desired inside shape of a predetermined area in the head or top of the container to be molded.

A pneumatically or hydraulically driven operating cylinder (not shown) can also take the place of the spring 30, 30a which cylinder is connected with or separated from a supply of the pressure agent by means of a control valve corresponding to the operating cycle.

The supply and filler arrangement 6 has a liftable and lowerable filling mandrel 32, which has a conelike lower end, with which it can be placed on the closed lower mold segments 12, 12a with interposition of the piece of tube 7. From the filling mandrel 32 a calibrating spike 33 projects, the spike 33 being movable axially relative to the main structure of mandrel 32. The filling mandrel 32, besides the previously described position and its rest position, can also assume the intermediate position shown in FIGS. 3 and 4, in which the calibrating spike 33 lies between the calibrating jaws 26, 26a. The calibrating spike 33 is of a cross-sectional shape corresponding with that yet to be produced for the inner surface of the container head. The spike can have various forms in the longitudinal and transverse cross section, but preferably is rectangular in longitudinal section and circular in transverse cross section, in order to make possible a tight insertion of a hollow cylindrical closure plug, not shown.

Figure 4:
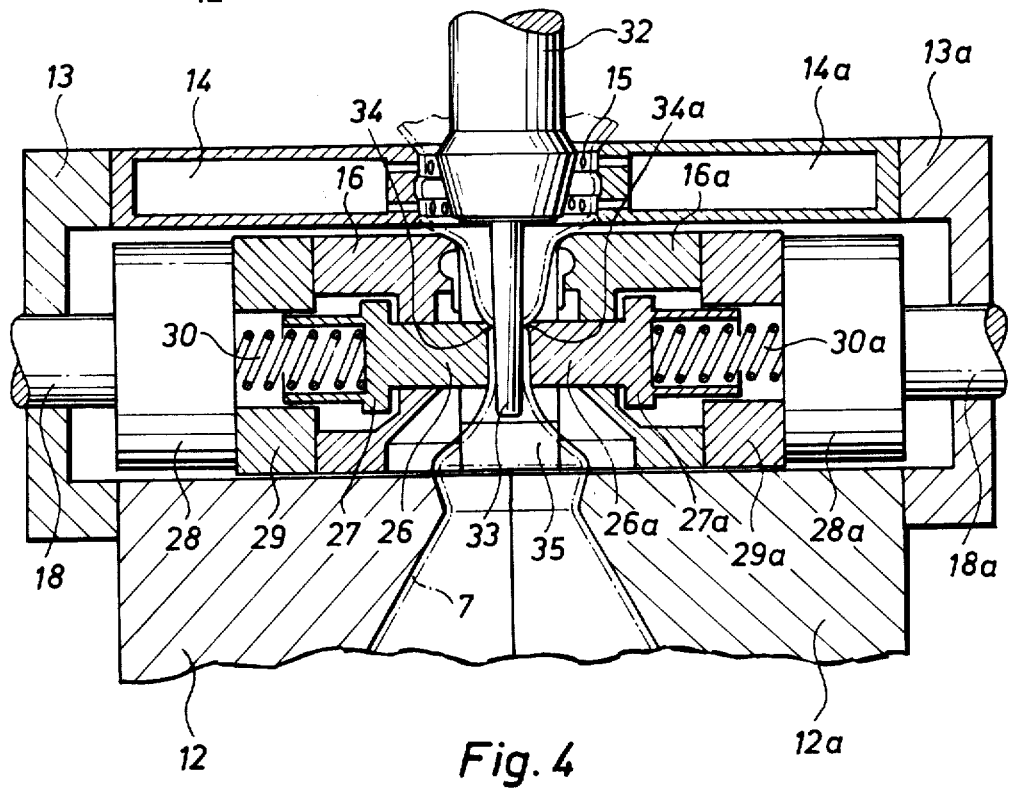
FIG. 4 is a vertical sectional view taken generally on line IV—IV, FIG. 3.

For the production of a shearing closure as can be seen in FIG. 3, the calibrating jaws 26, 26a have, in cross section, a triangular, inwardly projecting annular collar 34, 34a located at the top of the calibrating jaw assembly. The top mold segments 16, 16a are such that the shape of the container head shown in FIG. 3 can be produced.

In order for the calibrating jaws 26, 26a to have a more extended fit against the piece of tube 7 held on the calibrating spike 33, than the usual shifting time of the top halves of the mold 16, 16a from their rest position to their closing position permits, a stop piece 35 can be inserted by means of a shifting apparatus, especially an operating cylinder, for a short time between the top segments 16, 16a of the mold. The stop piece 35 can be wedge-shaped. Instead of a stop piece, the operating cylinder 18, 18a can also be a twostage cylinder, which interrupts the shifting movement of the top mold segments 16, 16a for a short time, whenever the calibrating jaws 26, 26a hold the tube 7 on the calibrating spike 33.

In FIGS. 1 and 2, the production mold 12, 12a, 16, 16a is shown below the orifice 4 of the screw extruder 5. The extruder 5 delivers the piece of tube 7 as a parison. As soon as the latter has reached a certain length, the two lower halves of the mold 12, 12a move together and receive the piece of tube between themselves and the vacuum chambers 14, 14a. A piece of tube projecting downwardly and cut off from the mold can drop down through an aperture 21 in the carriage 2, and an opening 22 in the table 1. The top mold segments 16, 16a are driven by the lower mold segments 12, 12a during movement of the latter, without, however, being moved into closing position. The piece of tube 7 is cut off above the vacuum chambers 14, 14a holding it, by knife 8.

Now the carriage 2 travels below the filling arrangement 6, the mandrel 32 of which is lowered so as to be inserted into the tube 7 (now in the form of a partially shaped container) and stands on the lower mold segments 12, 12a with interposition of the hose. Compressed air is blown via the line 9 into the partially formed container located in the lower mold segments 12, 12a for the purpose of blowing or inflating the container, which compressed air can escape from the blown up container by overcoming a certain pressure. After that a dosed quantity of the material with which the container is to be filled is introduced into the container by way of filling line 10, whereby compressed air is displaced from it. After filling of the container, the filling mandrel 32 is lifted into the position shown in FIGS. 3 and 4. The top mold segments 16, 16a now move toward each other, until they come to abut against the stop piece 35 pushed between them. Before the top mold segments 16, 16a engage the stop piece 35, the calibrating jaws 26, 26a have fitted themselves against the piece of tube 7 and hold the latter against and in conformity with the calibrating spike 33. Stop piece 35 is moved from the space between the top mold segments 16, 16a whenever the piece of tube between the calibrating jaws 26, 26a and the calibrating spike 33 has achieved a predetermined rigidity. The two top mold segments 16, 16a preferably remain in their intermediate position for only a short moment. As soon as the top mold segments 16, 16a are closed, the tube portion intended for the production of the container head fits itself under the effect of vacuum against the surfaces presented by mold segments 16, 16a and the part of the piece of tube projecting thereabove is squeezed out or provided with a preset breaking point in the area of the container head.

After closing of the container by finishing its head piece, the vacuum supply is turned off and the lower mold segments 12, 12a and of the top mold segments 16, 16a are opened and return into their initial positions. During opening of the mold, the filled container drops through the hole 21 in the carriage 2 and through the hole 23 in the table 1. The mold 12, 12a, 16, 16a again travels beneath the orifice 4 of the extruder 5 for reception of a new, hot-sealable piece of tube 7 and the operating processes for the production of a filled and closed container begin all over again. The process for the production of a container can be carried out controlled fully automatically.

What is claimed is:

1. In an apparatus for producing, filling and closing a container by blow molding from a heat-sealable thermoplastic material, the combination of mold means comprising a plurality of upright complementary lower mold members mounted for lateral movement between first positions, in which the lower mold members are spaced apart to allow downward introduction of a tubular parison, and second positions, in which the lower mold members are mutually engaged to define a mold cavity having the shape desired for the body of the container to be formed, and a plurality of complementary upper mold devices disposed at the top of said lower mold members and mounted for lateral movement between outer positions and inner positions independently of said lower molds;

means for introducing a tubular parison into the space between said lower mold members, when the lower members are in said first positions and the upper mold devices are in their outer positions, with the upper end of the parison extending above said upper mold devices;

mandrel means comprising a filling mandrel arranged for downward insertion into the parison to engage a portion of the parison between the filling mandrel and said lower mold members, for blowing and filling of the container, and a calibrating mandrel extending coaxially with respect to said filling mandrel and capable of projecting downwardly beyond the lower end of said filling mandrel, the combination of said filling and calibrating mandrels being so constructed and arranged that, after the main body of the container has been formed and filled, said filling mandrel can be withdrawn upwardly while a portion of said calibrating mandrel extends downwardly through the space between said upper mold devices;

said upper mold devices each comprising a main body portion, and a calibrating jaw movable relative to said main body portion toward and away from said calibrating mandrel;

power means for moving said lower mold members between said first and second positions; and means for urging said calibrating jaws toward said calibrating mandrel and against the portion of the parison surrounding said calibrating mandrel to form a head portion of the container with an internal shape and size conforming to the calibrating mandrel.

2. The combination defined in claim 1, wherein said calibrating jaws are each provided with an edge directed toward the calibrating mandrel and shaped to indent the portion of the parison which is forced against the calibrating mandrel by the calibrating jaws, whereby the container can be provided with a shearable top.

3. The combination defined in claim 1, wherein each of said main body portions of said upper mold devices further comprises a container-head-forming surface directed toward the mandrel means when the latter is inserted into the space between the mold members, said main body portions being movable toward and away from the calibrating mandrel independently of the calibrating jaw of the upper mold device.

4. The combination defined in claim 3 and further comprising stop means for limiting movement of said main body portions toward the calibrating mandrel.

5. The combination defined in claim 4 wherein said stop means comprises at least one stop member movable into and out of the space between said additional mold members.

6. The combination defined in claim 3, and further comprising a power device for each of said upper mold devices, each of said power devices having an operating member arranged to move toward the calibrating mandrel; and said upper mold devices each comprise means for imparting movement of the corresponding one of said operating members directly to said additional mold member, and resilient means interposed between said operating member and said calibrating jaw.

7. The combination defined in claim 1 wherein said calibrating mandrel is movable axially relative to said filling mandrel.

8. The method for producing a container from heat-sealable thermoplastic material by blow molding, filling the container, and closing the container, comprising introducing a tubular parison into a blow mold cavity which has a closed end to form the bottom of the container;

inserting a composite mandrel having a filling mandrel portion of larger transverse dimension and a calibrating mandrel portion of smaller transverse dimension into the parison, positioning the mandrel portion so that a portion of the parison opposite the bottom of the container is engaged between the filling mandrel portion and a mold member which defines the mold cavity, blowing the parison into container form and filling the container, withdrawing the filling mandrel portion from the container and maintaining the calibrating mandrel portion in a position within the top of the container, forcing calibrating mold members against a top portion of the container and thereby causing said top portion of the container to conform precisely in size and shape to the calibrating mandrel portion, withdrawing the calibrating mandrel portion from the container; and closing the top of the filled container.

* * * * *